March 5, 1963  M. T. ATWOOD ETAL  3,080,411
PROCESS FOR THE PREPARATION OF 2-METHYL-1-BUTENE
AND TRIALKYLALUMINUM COMPOUNDS
Filed Feb. 2, 1959
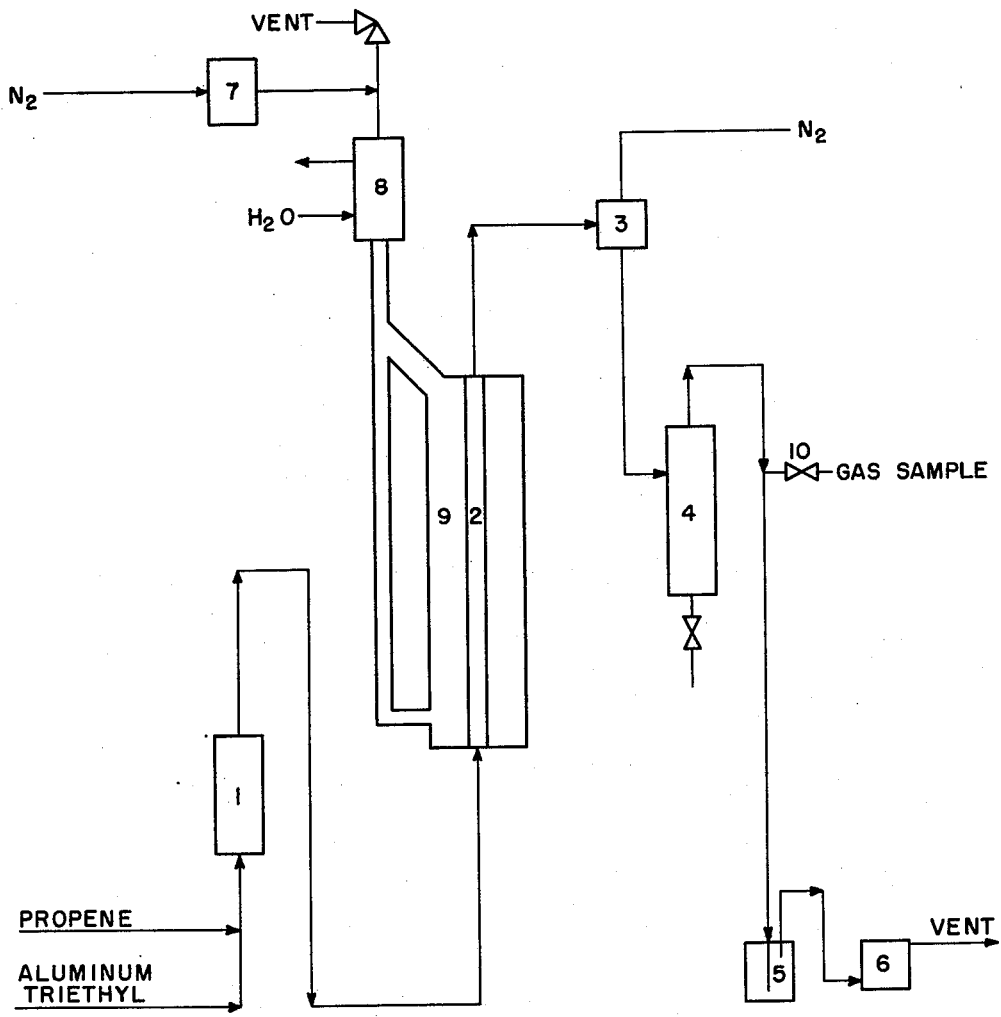
INVENTORS
MARK T. ATWOOD
GIFFORD G. McCLAFLIN
ALEXANDER SHADAN
BY Floyd Trimble
ATTORNEY 3,080,411
PROCESS FOR THE PREPARATION OF 2-METHYL-1-BUTENE AND TRIALKYLALUMINUM COMPOUNDS
Mark T. Atwood, Gifford G. McClaflin, and Alexander Shadan, Ponca City, Okla., assignors to Continental Oil Company, Ponca City, Okla., a corporation of Delaware
Filed Feb. 2, 1959, Ser. No. 790,468
10 Claims. (Cl. 260—448)

The present invention relates to a combined process for the preparation of 2-mythyl-1-butene and trialkylaluminum compounds. More particularly, it relates to a method of preparing (1) 2-methyl-1-butene of high purity and in good yields and (2) trialkylaluminum compounds which may be converted to high-molecular weight alcohols and α-olefins.

This application is a continuation-in-part of our co-pending application, Serial No. 704,742, filed December 23, 1957.

Heretofore, methods for the production of 2-methyl-1-butene have been, in the most part, rather expensive laboratory methods. Commercially, attempts for the preparation of the compound have employed a rather crude mixture of isomeric pentenes. As a result, the 2-methyl-1-butene so formed has been contaminated with other compounds. Since the recovery of 2-methyl-1-butene from such a mixture is difficult and expensive, this mixture has been used in the preparation of isoprene. This, in turn, has produced an isoprene which is impure and subsequent purification is necessary. Such purification methods have increasd the cost of preparing isoprene to such an extent that the method of manufacture is uneconomical.

It is highly desirable in a chemical process that all of the products have substantial value. As is well known, many chemical processes produce a secondary product having little or no value. Such processes are commercially feasible because of the inherent value of the primary product, or because the yield of secondary products is of an insignificant amount. Obviously, if the secondary products are present in any quantity, above that of trace amounts, it is economically desirable that they have a value approximately that of the primary product.

It is, therefore, a primary object of the present invention to provide a combined process for the preparation of 2-methyl-1-butene and useful trialkylaluminum compounds, which process obviates the disadvantages of the prior art. It is another object of the present invention to provide a process for the preparation of 2-methyl-1-butene, which process gives a high selectivity, good yield, and a minimum of undesirable products. It is also another object to provide a process in which the secondary products of the reaction have substantial value in themselves. Other objects and advantages will become apparent to those skilled in the art as the description proceeds.

Broadly stated, the process of the present invention comprises the following steps:

(a) the reaction of propene with triethylaluminum to form a product mixture comprising hydrocarbons and alkylaluminum compounds;
(b) distillation of the product mixture to recover 2-methyl-1-butene, propene, propene dimer, and an alkylaluminum residue;
(c) reaction of said alkylaluminum residue with ethylene to yield a product mixture containing higher molecular weight trialkylaluminum compounds.
(d) recycling the recovered propene of step (b);
(e) conversion of the higher molecular weight trialkylaluminum compounds of step (c) to useful products.

The process of the present invention has these distinct advantages:

(1) Propene is reacted with triethylaluminum under conditions which produce high selectivity, good yield, and a minimum of undesirable products, as for example, propene dimer.

(2) The impurities, or undesirable products, may be readily separated from the desired 2-methyl-1-butene. This we consider to be a salient feature of the present invention. In addition, it is a feature not present in prior art processes concerned with aluminum trialkyl chemistry.

(3) The process eliminates the possibility of contamination of the 2-methyl-1-butene with Raney nickel.

(4) The higher molecular weight trialkylaluminum compounds may be converted to high-molecular weight alcohols and α-olefins, which are of substantial commercial value, thereby lowering the cost of the 2-methyl-1-butene and, in turn, the isoprene produced therefrom.

Other advantages will be apparent as the description proceeds.

Before proceeding with specific examples illustrating our invention, it might be well to indicate the reactions used and to indicate the conditions under which the process operates. With regard to the reactions shown, it is to be understood that these are hypotheses and we do not intend to be limited thereby.

The principal reactions of step (a) may be shown as follows:

(1) 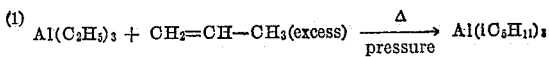

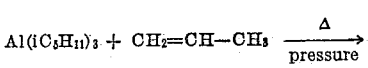

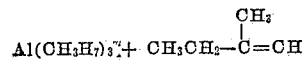

(2) 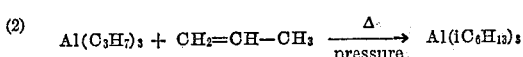

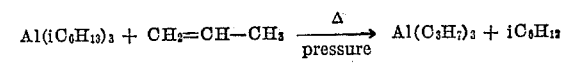

The reaction of step (c) may be shown as follows:

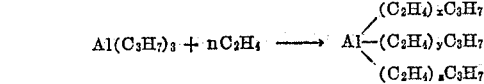

where $n=x+y+Z$ and $x$, $y$, and $z$, may or may not be equal, and may or may not be zero.

The alkyl groups of the aluminum trialkyl formed in our invention may contain up to 1,000 carbon atoms. Theoretically, there is no known limitation to the number of carbon atoms in the alkyl groups. For practical purposes, we prefer to prepare aluminum trialkyls in which the alkyl groups contain 100 carbon atoms or less.

The reaction conditions of step (a), the reaction of triethylaluminum with propene, may be summarized as follows:

| Reaction variable | Suitable range | Preferred range |
|---|---|---|
| Propene, Al($C_2H_5$)$_3$ mole ratio | 2–100 | 3–8. |
| Pressure, p.s.i.g. | 15–4,000 | 200–1,000. |
| Temperature, °C | 70–300 | 100–180. |
| Reaction time | 5 min.–8 hrs. | 30 min.–6 hrs. |

The reaction conditions of step (c), the reaction of ethylene with the alkylaluminum residue, may be summarized as follows:

| Reaction variable | Suitable range | Preferred range |
|---|---|---|
| Ethylene/alkylaluminum residue, mole ratio | 1:1–1000:1 | (¹) |
| Pressure, p.s.i.g. | 200–4000 | 1,000–2,000 |
| Temperature, °C | 80–160 | 110–130 |

¹ Mole ratio required to keep the solution saturated with ethylene under the process conditions.

Aluminum alkyls are pyrophoric and should be handled in a solvent. A suitable solvent would be any material which in itself does not react with aluminum alkyls. Examples of preferred solvents are saturated aliphatic and aromatic hydrocarbons.

The trialkylaluminum compounds of step (c) of the process of the present invention possess average molecular weights of about 240 and above. These materials may be oxidized and hydrolyzed to produce high-molecular weight primary straight-chain alcohols along with high-purity aluminum hydroxide. Alternatively, they may be reacted with ethylene in the presence of Raney nickel to give α-olefins and aluminum triethyl. If desired, these materials may be reacted with bromine to give straight-chain alkyl bromides and high-purity aluminum bromide.

It should be noted that the Raney nickel, as used in this process, does not have a chance to contaminate the 2-methyl-1-butene formed in step (a). As mentioned previously, this is a decided advantage. As is well known, Raney nickel is difficult to remove by filtration or centrifugation.

Our process may be operated on either a cyclic or a continuous basis. In the laboratory and small plant operation, it may be preferable to use a cyclic operation, since the apparatus required for a continuous operation is more expensive. On the other hand, for large-scale plant operation, this increased cost of apparatus is offset by a higher production rate and a lower unit cost.

In order to disclose the nature of the present invention still more clearly, the following illustrative examples will be given. It is to be understood, however, that the invention is not to be limited to the specific conditions or details set forth in these examples except insofar as such limitations are specified in the appended claims. Parts given are parts by weight.

REACTION OF PROPENE WITH TRIETHYLALUMINUM

The first step of the process of the reaction of propene with triethylaluminum to yield a product mixture comprising hydrocarbons and alkylaluminum compounds. Some of the variations possible are illustrated in the following examples.

Example I

Into a flask was introduced 20.7 parts of triethylaluminum, and the flask was placed in a rocking autoclave. The reactor was swept with dry $N_2$ gas, propene was forced in, and the temperature was raised slowly to 108–110° C. over a period of about 3 hours and the temperature maintained within this range for an additional period of approximately 2.5 hours. During this time, the propene pressure was maintained within a range of 1,100 to 1,480 p.s.i.g. The reactor was allowed to stand and cool off overnight, the contents were removed, the flask was rinsed with toluene, and the washings were added to the reaction product mixture. The toluene layer of the product mixture was separated and distilled to yield hydrocarbons boiling within the range of 44.5° to 108° C. The remainder of the product was hydrolyzed to yield a mixture of hydrocarbons. A sample of the liberated hydrocarbons was collected and analyzed in a mass spectrometer. The composition of the mixture is tabulated below:

| Hydrocarbon: | Mole percent |
|---|---|
| Ethylene | 4.98 |
| Ethane | 88.70 |
| Propene | 0.45 |
| Iso-butane | 3.14 |
| Iso-pentane | 1.04 |

The analytical data indicate that there was a 6.3 percent conversion of triethylaluminum to a product mixture which contained approximately 19 mole percent ($C_5H_{11}$)$_3$Al and 2-methyl-1-butene, which may be considered as isoprene precursors.

Example II

Into a reactor was introduced 22 parts of triethylaluminum. The flask was placed in an autoclave, the reactor was flushed with dry $N_2$ gas, and propene was forced in. The temperature was raised to 112° C. over a period of about 2.25 hours and was maintained at this level for approximately 0.75 hour. Propene was pumped in as necessary to maintain a pressure of 700 to 1,500 p.s.i.g. The alkylaluminum product was hydrolyzed, and the liberated hydrocarbons were analyzed in a mass spectrometer. The results are tabulated below:

| Hydrocarbon: | Mole percent |
|---|---|
| Ethylene | 4.68 |
| Ethane | 67.40 |
| Propene | 0.28 |
| Butene | 0.51 |
| Iso-butane | 1.52 |
| Butane | 0.60 |
| Pentenes | 2.42 |
| Pentanes | 5.97 |

The conversion of triethylaluminum to other aluminum alkyls was approximately 28 percent, of which product approximately 74 mole percent was isoprene precursors.

In the following examples, a continuous process was used. The experimental equipment is shown in the figure. The reactor proper consisted of a ½-inch diameter steel tube, 2, which was surrounded by a 6-inch steel pipe, 9, containing two electric immersion heaters. A liquid hydrocarbon having the desired normal boiling point (examples of which are xylene and t-butyl benzene) was placed in the jacket. Using nitrogen through a regulator, 7, the pressure on the jacket could be varied, thereby permitting a wide range of controlled temperatures. The condenser, 8, served to condense the hydrocarbon vapors and return them to the jacket 9.

In conducting the reaction, the triethylaluminum and propene were introduced into the saturator, 1, where the triethylaluminum was saturated with the propene. From the saturator, 1, the reactants passed to the reactor, 2. A back pressure of nitrogen was maintained on the reactor by means of the back pressure regulator, 3. When the pressure in reactor, 2, was greater than the back pressure of nitrogen in the back pressure regulator, 3, the diaphragm permitted the product to flow to the liquid trap, 4. The light gases passed from the liquid trap, 4, through the scrubber, 5, to the wet test meter, 6, where the volume was recorded, and then to the vent. A sample of the gas was taken at 10 for analysis. In a commercial process, the gases from the scrubber, 5, would go to a recovery tower, with the propene recovered therefrom being recycled. The time of reaction is regulated by controlling the flow rates of propene and triethylaluminum. Gauges, valves, and other minor equipment are not shown in the figure.

MATERIALS

Propylene—99 mole percent purity—purchased
Aluminum triethyl—96 mole percent purity—purchased

PROCEDURE

The tubular reactor was heated to the desired temperature. The desired pressure was put on the Grove back pressure regulator. Propylene and aluminum triethyl, previously heated, were pumped into the reactor. The pumping rates of the propylene and aluminum triethyl pumps were set as desired. When the reactor was liquid full, the system was allowed to purge until three times the volume capacity of the reactor had passed through the reactor. A run was then started.

*Examples III–V*

These examples were run at the following conditions:

Temperature _____ 250–255
Pressure, p.s.i.g. _____ 240–810
Mole ratio _____ 5.6–9.7
Reaction time _____ 12 min.–2 hrs.

The data for these examples are shown in Table I.
In general, the data for these runs indicate that these conditions give poor selectivity and high propylene polymer formation.

TABLE I

|  | Example III | Example IV | Example V |
|---|---|---|---|
| Temperature, °C | 252 | 251 | 255 |
| Pressure, p.s.i.g | 810 | 810 | 240 |
| Mole/ratio | 5.7 | 9.7 | 5.6 |
| Reaction time, hours | 1.5 | 2 | [1]12 |
| Yield, percent | 40.5 | 38.6 | 31.0 |
| Selectivity, percent | 44.1 | 41.0 | 48.0 |
| Conversion, percent | 92.2 | 94.0 | 63.5 |
| By-products in moles per mole of $iC_5$: |  |  |  |
| $C_4$ | .19 | .19 | .14 |
| $nC_5$ | .13 | .2 | .27 |
| $iC_6$ | .81 | 1.64 | 1.15 |
| $iC_7$ |  |  |  |
| Ethylene recovery | 99.5 | 104.8 |  |

[1] Minutes.

*Examples VI–IX*

These examples were run at the following conditions:

Temperature, °C. _____ 180–221
Pressure, p.s.i.g. _____ 750–775
Mole ratio _____ 2.0–3.4
Reaction time, min. _____ 25.5–28.8

The data for the examples are shown in Table II.
In general, the data for these runs indicate that higher temperatures give higher conversions but at the same time produce a higher ratio of by-products.

TABLE II

|  | Ex. VI | Ex. VII | Ex. VIII | Ex. IX |
|---|---|---|---|---|
| Temperature, °C | 180 | 221 | 200 | 200 |
| Pressure, p.s.i.g | 750 | 775 | 770 | 750 |
| Mole/ratio | 2.7 | 3.4 | 3.4 | 2.0 |
| Reaction time, min | 28.8 | 27 | 27 | 25.5 |
| Yield, percent | 12.9 | 28.6 | 32.8 | 21.7 |
| Selectivity, percent | 33.2 | 40.2 | 51.9 | 50.3 |
| Conversion, percent | 41.4 | 71.2 | 65.2 | 45.5 |
| By-products in moles per mole of $iC_5$: |  |  |  |  |
| $C_4$ | .23 | .24 | .22 | .4 |
| $nC_5$ | .15 | .24 | .19 | .26 |
| $iC_6$ | .49 | 1.02 | .67 | .52 |
| $iC_7$ |  | 0.16 | .08 | .08 |
| Ethylene recovery | 88.0 | 93.7 | 96.5 | 105.3 |

*Examples X–XVI*

These examples were run at the following conditions:

Temperature, °C. _____ 200–204
Pressure, p.s.i.g. _____ 250–1,500
Mole ratio _____ 1.0–6.6
Reaction time _____ 14.9 min.–1.86 hr.

The data for these examples are shown in Table III.
In general, these data indicate the following:
(1) Temperatures in the range of 200–204° C. do not give good selectivities, and
(2) The pressure must be greater than 250 p.s.i.g. and less than 1,500 p.s.i.g. in order to obtain high selectivities.

TABLE III

|  | Ex. X | Ex. XI | Ex. XII | Ex. XIII | Ex. XIV | Ex. XV | Ex. XVI |
|---|---|---|---|---|---|---|---|
| Temperature, °C | 204 | 204 | 204 | 204 | 204 | 200 | 200 |
| Pressure, p.s.i.g | 770 | 770 | 775 | 750 | 1,500 | 250 | 770 |
| Mole/ratio | 6.6 | 1.0 | 2.6 | 3.6 | 3.3 | 3.5 | 2.6 |
| Reaction time, min | 25 | 26 | 14.9 | 43.3 | 26.3 | 23.5 | [1]1.86 |
| Yield, percent | 37.9 | 32.2 | 23.7 | 24.3 | 32.4 | 18.5 | 31.2 |
| Selectivity, percent | 56.4 | 70.2 | 43.5 | 37.3 | 47.5 | 36.9 | 42.7 |
| Conversion, percent | 68.5 | 47.8 | 54.5 | 66.4 | 69.4 | 52.0 | 74.3 |
| By-products in moles per mole of $iC_5$ |  |  |  |  |  |  |  |
| $C_4$ | .19 | .27 | .39 | .30 | .22 | .36 | .23 |
| $nC_5$ | .15 | .10 | .17 | .22 | .14 | .18 | .20 |
| $iC_6$ | .50 | .66 | .62 | .94 | .69 | .62 | .94 |
| $iC_7$ | .04 | .08 | .07 | .04 | .09 | .02 | .04 |
| Ethylene recovery | 95.1 | 84.5 | 96.7 | 87.8 | 93.2 | 90.5 | 93.4 |

[1] Hours.

*Examples XVII–XXIV*

These examples were run at the following conditions:

Temperature, °C _____ 171–183
Pressure, p.s.i.g _____ 525–560
Mole ratio _____ 1.2–3.5
Reaction time _____ 21.4 sec.–19.9 min.

The data for these examples are shown in Table IV.
In general, the data for these runs indicate a low conversion.

TABLE IV

|  | Ex. XVII | Ex. XVIII | Ex. XIX | Ex. XX | Ex. XXI | Ex. XXII | Ex. XXIII | Ex. XXIV |
|---|---|---|---|---|---|---|---|---|
| Temperature, °C | 180 | 183 | 179 | 177 | 184 | 182 | 177 | 171 |
| Pressure, p.s.i.g | 535 | 535 | 555 | 560 | 525 | 535 | 535 | 535 |
| Mole/ratio | 3.26 | 3.24 | 3.5 | 3.3 | 2.4 | 1.2 | 1.75 | 6.4 |
| Reaction time, min | 19.9 | 16.0 | 10.6 | [1]21.4 | 2.16 | 16.4 | 14.9 | 14.9 |
| Yield, percent | 24.4 | 18.0 | 20.5 | 3.9 | 5.2 | 11.6 | 16.6 | 30.4 |
| Selectivity, percent | 50.7 | 44.2 | 78.0 | 54.2 | 38.8 | 47.1 | 66.5 | 11.7 |
| Conversion, percent | 48.1 | 40.7 | 28.1 | 7.1 | 13.4 | 24.5 | 25.0 | 25.9 |
| By-products in moles per mole of $iC_5$: |  |  |  |  |  |  |  |  |
| $C_4$ | .22 | .25 | .17 | .30 | .38 | .31 | .17 | .12 |
| $nC_5$ | .07 | .07 | .03 | .02 | .03 | .05 | .04 | .04 |
| $iC_6$ | .26 | .25 | .14 | .33 | .34 | .18 | .13 | .14 |
| $iC_7$ | .06 | .04 | .01 | .11 | .06 | .03 | .03 | .01 |
| Ethylene recovery | 97.2 | 94.3 | 106.5 | 111.0 | 118.1 | 101.0 | 104.5 | 145.0 |

[1] Seconds.

Examples XXV–XXIX

These examples were run at the following conditions:

| | |
|---|---|
| Temperature, °C | 185–208 |
| Pressure, p.s.i.g. | 525–540 |
| Mole ratio | 0.36–6.8 |
| Reaction time, min | 14.9–15.7 |

The data for these examples are shown in Table V.

In general, the data for these runs, together with those for the runs of Examples XVII to XXIV, preceding, indicate that a lower temperature gives better selectivity with a decreasing amount of by-product.

TABLE V

| | Ex. XXV | Ex. XXVI | Ex. XXVII | Ex. XXVIII | Ex. XXIX |
|---|---|---|---|---|---|
| Temperature, °C | 185 | 184 | 190 | 199 | 208 |
| Pressure, p.s.i.g. | 540 | 525 | 540 | 535 | 540 |
| Mole/ratio | 6.8 | 0.36 | 2.97 | 2.89 | 2.97 |
| Reaction time, min | 14.9 | 15.7 | 14.9 | 14.9 | 14.9 |
| Yield, percent | 19.3 | 7.98 | 19.3 | 35.8 | 35.0 |
| Selectivity, percent | 41.7 | 36.0 | 43.9 | 61.4 | 51.6 |
| Conversion, percent | 46.3 | 22.2 | 44.0 | 58.3 | 68.0 |
| By-products in moles per mole of $iC_5$: | | | | | |
| $C_4$ | .47 | .47 | .27 | .25 | .36 |
| $nC_5$ | .06 | .06 | .09 | .06 | .07 |
| $iC_6$ | .48 | .30 | .29 | .34 | .41 |
| $iC_7$ | .02 | .04 | .03 | .04 | .12 |
| Ethylene recovery | 107.2 | 99.0 | 94.0 | 109.0 | 110.6 |

Examples XXX–XXXVIII

These examples were run at the following conditions:

| | |
|---|---|
| Temperature, °C | 138–158 |
| Pressure, p.s.i.g. | 700–710 |
| Mole ratio | 1.37–10.40 |
| Reaction time | 24.8 min.–2.97 hrs. |

The data for these examples are shown in Table VI.

These examples were run at nearly identical pressures and at similar temperatures; the mole ratios and reaction times were varied over a wide range. The data indicate the beneficial effect of a longer reaction time. In addition, it is apparent that mole ratios of 3 to 7 are preferable.

TABLE VI

| | Ex. XXX | Ex. XXXI | Ex. XXXII | Ex. XXXIII | Ex. XXXIV | Ex. XXXV | Ex. XXXVI | Ex. XXXVII | Ex. XXXVIII |
|---|---|---|---|---|---|---|---|---|---|
| Temperature, °C | 138 | 139 | 140 | 141 | 141 | 158 | 158 | 158 | 157 |
| Pressure, p.s.i.g. | 700 | 700 | 710 | 700 | 700 | 700 | 700 | 700 | 710 |
| Mole/ratio | 10.40 | 1.72 | 5.36 | 1.37 | 1.91 | 5.45 | 5.7 | 2.8 | 2.8 |
| Reaction time, min | 27.9 | [1] 2.97 | 27.9 | [1] 1.98 | 24.8 | [1] 1.84 | 32.7 | [1] 2.21 | 40. |
| Yield, percent | 7.5 | 33.6 | 8.3 | 20.1 | 5.9 | 43.6 | 15.7 | 33.0 | 13.9 |
| Selectivity, percent | 49.4 | 46.3 | 35.7 | 51.0 | 45.5 | 61.5 | 52.3 | 74.2 | 52.6 |
| Conversion, percent | 15.2 | 72.5 | 23.3 | 39.4 | 12.9 | 70.8 | 30.1 | 44.5 | 26.5 |
| By-products in moles per mole of $iC_5$: | | | | | | | | | |
| $C_4$ | .05 | .182 | .112 | .139 | .122 | .119 | .092 | .092 | .082 |
| $nC_5$ | .013 | .040 | .019 | .030 | .011 | .034 | .026 | .030 | .022 |
| $iC_6$ | .050 | .421 | .075 | .183 | .100 | .338 | .082 | .238 | .066 |
| $iC_7$ | 0.000 | .005 | .019 | .005 | 0.000 | .004 | 0.000 | 0.000 | 0.000 |
| Ethylene recovery | 104.0 | 75.7 | 90.5 | 87.5 | 94.6 | 85.9 | 90.7 | 96.9 | 90.4 |

[1] Hours.

Examples XXXIX–XLI

These examples were run at the following conditions:

| | |
|---|---|
| Temperature, °C | 138–140 |
| Pressure, p.s.i.g. | 690–700 |
| Mole ratio | 6.62–7.86 |
| Reaction time, hrs. | 2.13–2.29 |

The data for these examples are shown in Table VII.

These examples were run at very similar conditions and indicate, in general, the repeatability of the process. It is evident that the selectivity is high on all of these examples. In addition, it is evident that the by-products, in general, are very low.

TABLE VII

| | Example XXXIX | Example XL | Example XLI |
|---|---|---|---|
| Temperature, °C | 140 | 138 | 140 |
| Pressure, p.s.i.g. | 695 | 700 | 690 |
| Mole/ratio | 7.86 | 6.85 | 6.62 |
| Reaction time, hours | 2.13 | 2.29 | 2.21 |
| Yield, percent | 27.2 | 39.3 | 35.7 |
| Selectivity, percent | 81.0 | 83.3 | 78.8 |
| Conversion, percent | 33.6 | 44.6 | 45.3 |
| By-products in moles per mole of $iC_5$: | | | |
| $C_4$ | .044 | .12 | .117 |
| $nC_5$ | .020 | .038 | .030 |
| $iC_6$ | .100 | .230 | .195 |
| $iC_7$ | .007 | .003 | .003 |
| Ethylene recovery | 98.7 | 108.5 | 100.0 |

Example XLII

This example illustrates the conversion of the alkyl-aluminum residue to a product mixture containing higher molecular weight trialkylaluminum compounds.

Thirteen grams (16 milliliters) of aluminum tripropyl in 40.9 grams (48 milliliters) of xylene was added to a stirring autoclave which had been flushed with nitrogen. The autoclave was heated to 108° C. and ethylene was added to a pressure of 1,500 p.s.i.g. The reaction was allowed to continue for three hours while maintaining a temperature of 108–138° C. After venting the autoclave, the aluminum trialkyls and solvent remaining weighed 92 grams, which represents a gain of 38.1 grams. This material was then hydrolyzed at 50° C. using 25 percent HCl and an ice water condenser. Hydrolysis gave at standard temperature and pressure 2,770 milliliters (0.123 mole) of gas, an aqueous layer and an organic layer. The aqueous layer was discarded. The total yield of organic layer was 78 grams (102 milliliters). Correcting for the xylene originally present, the net yield of product in the organic layer was approximately 37 grams.

The gas was analyzed by mass spectrometer and found to contain both odd and even number hydrocarbons, ranging from C-2 to C-6. The organic layer was analyzed by GLPC. Analysis showed a major portion of hydrocarbons containing 8 carbon atoms or more, with both odd and even number hydrocarbons being present. The over-all ratio, both gas and organic layer, of odd to even number hydrocarbons was 0.4 to 1. In calculating the composition of the organic layer, correction was made for the xylene present. Table VIII gives the composition of this organic layer, as corrected.

TABLE VIII

*Composition of Hydrolysis Products—Organic Layer*
[Corrected for xylene present]

| Hydrocarbon group | $C_4$ | $C_5$ | $C_6$ | $C_7$ | $C_8$ | $C_9$ | $C_{10}$ | $C_{11}$ |
|---|---|---|---|---|---|---|---|---|
| Moles | .007 | .008 | .025 | .006 | .025 | .008 | .024 | .023 |

The GLPC analysis refers to gas liquid partition chromatography. This analytical technique is adequately described in either of the following publications: Analyst, 77, 1952, pages 915–932, or Petroleum Refiner, November 1955, pages 165–169.

In the laboratory example we have hydrolyzed the aluminum trialkyl in order to convert the alkyl groups to hydrocarbons for analysis. Commercially, these aluminum trialkyls would be converted to useful products, e.g. alcohols, as hereinbefore described.

In summary, we have shown a combined process for the preparation of 2-methyl-1-butene and trialkylaluminum compounds. The 2-methyl-1-butene may be prepared under a wide range of conditions, but we have shown a narrower range of conditions under which the selectivity of the desired product is increased and the formation of undersirable products is kept at a minimum. We have shown further that the trialkylaluminum compound, formed as a by-product of the first step of our process, may be converted to useful products.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. A process for the production of 2-methyl-1-butene and trialkylaluminum compounds of the general formula:

where R, R', and R'' represent alkyl radicals containing from 5 to 100 carbon atoms, said process comprising the following steps:

(a) reaction of propene with triethylaluminum essentially in the absence of ethylene at a temperature below 200° C. where decomposition of triethylaluminum does not occur, at a pressure of 100–2,000 p.s.i.g. and in the ratio of about 0.3 to about 10 moles of propene per mole of triethylaluminum to form a product mixture comprising hydrocarbons and alkylaluminum compounds, said mixture being substantially free from n-pentenes, (b) distillation of the product mixture to recover therefrom 2-methyl-1-butene, propene, propene dimer, and an alkylaluminum residue, (c) reaction of said alkylaluminum residue with ethylene to yield a product mixture containing higher molecular weight trialkylaluminum compounds.

2. The process of claim 1 wherein step (a) is conducted under the following conditions:

Propene to triethylaluminum mole ratio_____ 2–10
Pressure, p.s.i.g_____ 100–2,000
Temperature, ° C_____ 100–180

3. The process of claim 1 wherein step (a) is conducted under the following conditions:

Propene to triethylaluminum mole ratio_____ 3–8
Pressure, p.s.i.g_____ 200–1,000
Temperature, ° C_____ 100–180

4. The process of claim 1 wherein step (a) is conducted under the following conditions:

Propene to triethylaluminum mole ratio_____ 2–10
Pressure, p.s.i.g_____ 100–2,000
Temperature, ° C_____ 100–180 and wherein step (c) is conducted under the following conditions:

Ethylene/alkylaluminum residue, mole ratio__ 1–1,000
Pressure, p.s.i.g_____ 200–4,000
Temperature, ° C_____ 80–150

5. The process of claim 1 wherein step (a) is conducted under the following conditions:

Propene to triethylaluminum mole ratio_____ 3–8
Pressure, p.s.i.g_____ 200–1,000
Temperature, ° C_____ 100–180 and wherein step (c) is conducted under the following conditions:

Ethylene/alkylaluminum residue, mole ratio__ 1–1,000
Pressure, p.s.i.g_____ 200–4,000
Temperature, ° C_____ 80–150

6. The process of claim 1 wherein said process is operated on a cyclic basis.

7. The process of claim 1 wherein said process is operated on a continuous basis.

8. The reaction of propene with triethylaluminum essentially in the absence of ethylene under the following conditions:

Propene to triethylaluminum mole ratio_____ 2–10
Pressure (p.s.i.g.)_____ 100–2,000
Temperature (° C.)_____ 100–180 to yield a product mixture comprising hydrocarbons and alkylaluminum compounds, said mixture being substantially free from n-pentenes, and recovery of 2-methyl-1-butene from said product mixture.

9. In a continuous process for manufacture of 2-methyl-1-butene, the steps of reacting propene with triethylaluminum essentially in the absence of ethylene under the following conditions:

Propene to triethylaluminum mole ratio_____ 0.36–10.4
Pressure (p.s.i.g.)_____ Above about 525
Temperature (° C.)_____ About 135–about 185
Reaction time_____ About 20 sec.–about 3 hr.

to yield a product mixture comprising hydrocarbons and alkylaluminum compounds, said mixture being substantially free from n-pentenes, and recovering 2-methyl-1-butene from said product mixture.

10. In a continuous process for manufacture of 2-methyl-1-butene, the steps of reacting propene with triethylaluminum essentially in the absence of ethylene under the following conditions:

Propene to triethylaluminum mole ratio_____ Approx. 2–8
Pressure (p.s.i.g.)_____ Above about 700
Temperature (° C.)_____ From about 135 to about 160
Reaction time_____ From about 30 min. to about 2.3 hr.

to yield a product mixture comprising hydrocarbons and alkylaluminum compounds, said mixture being substantially free from n-pentenes, and recovering 2-methyl-1-butene from said product mixture.

References Cited in the file of this patent

UNITED STATES PATENTS

| | | |
|---|---|---|
| 2,695,327 | Ziegler et al. | Nov. 23, 1954 |
| 2,699,457 | Ziegler et al. | Jan. 11, 1955 |
| 2,863,896 | Johnson | Dec. 9, 1958 |
| 2,889,385 | Cotterall et al. | June 2, 1959 |

OTHER REFERENCES

Coates: Organo-Metallic Compounds, Methuen's Monographs on Chemical Subjects, London 1956, pp. 77–78.